(12) United States Patent
Yoshino et al.

(10) Patent No.: US 8,106,557 B2
(45) Date of Patent: Jan. 31, 2012

(54) PERMANENT MAGNET SYNCHRONOUS MOTOR AND HERMETIC COMPRESSOR

(75) Inventors: Hayato Yoshino, Tokyo (JP); Yoshio Takita, Tokyo (JP); Koji Yabe, Tokyo (JP); Takashi Ishigaki, Tokyo (JP); Koji Masumoto, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 0 days.

(21) Appl. No.: 12/525,013

(22) PCT Filed: Feb. 21, 2007

(86) PCT No.: PCT/JP2007/053141
§ 371 (c)(1),
(2), (4) Date: Jul. 29, 2009

(87) PCT Pub. No.: WO2008/102439
PCT Pub. Date: Aug. 28, 2008

(65) Prior Publication Data
US 2010/0117477 A1    May 13, 2010

(51) Int. Cl.
*H02K 1/27* (2006.01)
(52) U.S. Cl. .............................. 310/156.53; 310/156.56
(58) Field of Classification Search ............. 310/156.57, 310/156.48, 156.53, 156.56, 216.009
See application file for complete search history.

(56) References Cited

U.S. PATENT DOCUMENTS

| | | | |
|---|---|---|---|
| 5,731,647 A * | 3/1998 | Schuller et al. | 310/114 |
| 6,700,284 B2 * | 3/2004 | Williams et al. | 310/216.075 |
| 6,917,133 B2 * | 7/2005 | Koharagi et al. | 310/156.57 |
| 7,233,090 B2 * | 6/2007 | Evans et al. | 310/156.57 |

(Continued)

FOREIGN PATENT DOCUMENTS

JP    11-187597 A    7/1999

(Continued)

OTHER PUBLICATIONS

Form PCT/ISA/210 (International Search Report) dated May 1, 2007.

(Continued)

*Primary Examiner* — Dang D Le
(74) *Attorney, Agent, or Firm* — Buchanan Ingersoll & Rooney PC

(57) ABSTRACT

It is an objective to provide a permanent magnet synchronous motor that is highly efficient with low vibration and low noise. A stator 30 includes a stator core 1 that includes magnetic pole teeth 2 each formed between adjacent slots 3, and stator windings 4 that are provided in the slots 3 of the stator core 1. A rotor 40 includes a rotor core 5, a plurality of magnet retaining holes 8, permanent magnets 7 inserted in the magnet retaining holes 8, and a plurality of slits 6 in the rotor core 5 on an outer circumferential side of the magnet retaining holes 8. Among the slits 6, slits 6 in a vicinity of a magnetic pole center of the rotor core 5 are oriented in a direction where a magnetic flux generated by a permanent magnet 7 converges outside the rotor core 5, whereas slits 6 in a vicinity of a pole border portion of the rotor core 5 are oriented in another direction that is different from the direction of the plurality of slits 6 in the vicinity of the magnetic pole center of the rotor core 5.

14 Claims, 5 Drawing Sheets

U.S. PATENT DOCUMENTS

| | | | |
|---|---|---|---|
| 7,282,827 B2 * | 10/2007 | Futami | 310/156.48 |
| 7,768,172 B2 * | 8/2010 | Takahata et al. | 310/156.57 |
| 2007/0252467 A1 * | 11/2007 | Hoemann et al. | 310/156.53 |

FOREIGN PATENT DOCUMENTS

| | | | |
|---|---|---|---|
| JP | 2001-037186 A | 2/2001 | |
| JP | 2001-178036 A | 6/2001 | |
| JP | 2005-094968 A | 4/2005 | |
| JP | 2005-168097 A | 6/2005 | |
| JP | 2005-210793 A | 8/2005 | |
| JP | 2006-014450 A | 1/2006 | |
| KR | 10-2006-0039948 | 5/2006 | |

OTHER PUBLICATIONS

English-language translation of Korean Office Action dated Oct. 13, 2010 issued in corresponding Korean Patent Application No. 10-2009-7007099.

Chinese Office Action dated Nov. 12, 2010 issued in corresponding Chinese Patent Application No. 2007800421916, and English-language translation.

*Decision to Reject Patent Application* dated May 30, 2011, issued in the corresponding Korean Patent Application No. 10-2009-7007099, and partial English-language translation.

* cited by examiner

PERMANENT MAGNET SYNCHRONOUS MOTOR AND HERMETIC COMPRESSOR

TECHNICAL FIELD

The present invention relates to a permanent magnet synchronous motor, which is generally mounted on a hermetic compressor, etc.

BACKGROUND ART

A rotor with embedded permanent magnets has been proposed to reduce torque ripple in a rotor with embedded permanent magnets where the phase of a current is difficult to control (See Patent Document 1, for example). The rotor with embedded permanent magnets has permanent magnets embedded in an approximately cylindrical rotor core in a longitudinal direction. The rotor with embedded permanent magnets has a plurality of slits elongated from a vicinity of each permanent magnet on the outer circumferential side of the rotor core to a vicinity of the outer surface of the rotor.

A permanent magnet motor has also been proposed in pursuit of achieving a highly efficient permanent magnet motor with low noise and low vibration. The permanent magnet motor is designed to reduce armature reaction flux and also improve magnetic flux distribution of a core at an outer circumference (See Patent Document 2, for example). The permanent magnet motor is characterized by including permanent magnet holding slots, which are formed in a rotor core in portions corresponding to the respective sides of an approximately regular polygon whose center is at the axial center of the rotor core; permanent magnets embedded in the respective permanent magnetic holding slots; and four or more radially elongated slits, which are formed in the core on the outer circumferential side of the permanent magnet holding slots, and are spaced from each other along each of the permanent magnet holding slots. The permanent magnet motor is also characterized in that the pitches of the slits in end portions (near the outer circumference of the rotor core) in the radial direction are made approximately equal, and the pitches of the slits in inner portions in the radial direction are made varied so that a pitch in a portion near the permanent magnet center is the largest, and pitches then decrease with distance from the center to the ends.
Patent Document 1: P11-187597A
Patent Document 2: P2005-94968A

DISCLOSURE OF THE INVENTION

Problems to be Solved by the Invention

The rotor with embedded permanent magnets of the Patent Document 1, however, poses the following problems. Electromotive force in the stator windings contains a waveform with a large amount of harmonic components. This may cause an increase in vibration and noise. In addition, an increased iron loss may result in inefficiency.

The permanent magnet motor of the Patent Document 2 also poses the following problems. While the amount of harmonic components contained in electromotive force in the stator windings is lowered, the complicated shape of the slits increases the process costs. In addition, the permanent magnet motor fails to achieve the effective use of the magnetic flux of the permanent magnets in their end portions. This may also result in inefficiency.

The present invention is directed to solving problems mentioned earlier. It is an object to provide a permanent magnet synchronous motor and a hermetic compressor that are highly efficient with low vibration and low noise.

Means to Solve the Problems

A permanent magnet synchronous motor according to this invention, which includes a stator and a rotor, is characterized as follows.

The stator may include a stator core and stator windings. The stator core may be formed by layers of magnetic steel plates and include magnetic pole teeth which are each formed between adjacent slots. The stator windings are provided in the slots of the stator core.

The rotor may be placed on an inner circumferential side of the magnetic pole teeth of the stator via an air gap. The rotor may include a rotor core that is formed by layers of magnetic steel plates; a plurality of magnet retaining holes formed in the rotor core along an outer circumference of the rotor core; permanent magnets inserted in the magnet retaining holes; and a plurality of slits formed in the rotor core on an outer circumferential side of the magnet retaining holes. The slits are elongated from a vicinity of the permanent magnets to a vicinity of the outer circumference of the rotor core, Among the slits, slits in a vicinity of a magnetic pole center of the rotor core may be oriented in a direction where a magnetic flux generated by a permanent magnet converges outside the rotor core, whereas slits in a vicinity of a pole border portion of the rotor core may be oriented in another direction that is different from the direction of the slits formed in the vicinity of the magnetic pole center of the rotor core.

The permanent magnet synchronous motor is further characterized in that the stator may use a concentrated winding method by which the stator windings are directly wound around the magnetic pole tooth.

The permanent magnet synchronous motor is further characterized in that the slits in the vicinity of the magnetic pole center of the rotor core may be formed within a width of the magnetic pole tooth on a side facing the air gap and opposed to the rotor core.

The permanent magnet synchronous motor is further characterized in that the stator core may be an assembly of separate cores, each of which may include one of the magnetic pole teeth.

The permanent magnet synchronous motor is further characterized in that a distance between the slits that are formed in the vicinity of pole border portions of the rotor core and positioned at both ends of a magnet retaining hole in the circumferential direction may be larger than a width of the magnetic pole tooth on a side facing the air gap. The distance may be measured from corners of the slits on a side facing a magnet retaining hole and on sides facing respective pole border portions of the rotor core.

The permanent magnet synchronous motor is further characterized in that a width in a radial direction of an outside narrow bridge in the pole border portion may be larger than a width in the radial direction of another outside narrow bridge. The outside narrow bridge in the pole border portion may be a part of the core on the outer circumferential side of a magnet retaining hole in a vicinity of the pole border portion of rotor, and the another outside narrow bridge may be a part of the core on the outer circumferential side of one of the slits formed in the vicinity of the pole border portion.

The permanent magnet synchronous motor is further characterized in that a sum of the width in the radial direction of the another outside narrow bridge and a width in the radial direction of an inside narrow bridge may be larger than the width in the radial direction of the outside narrow bridge in the pole border portion. The inside narrow bridge may be a part of the core between the one of the slits formed in the vicinity of the pole border portion and the magnet regaining hole.

A hermetic compressor according to this invention is characterized by including the permanent magnet synchronous motor mentioned above.

Effects

A permanent magnet synchronous motor according to the present invention, thus configured, may achieve an effective use of the magnetic flux of permanent magnets. This may result in achieving a highly efficient permanent magnet synchronous motor. The highly efficient permanent magnet synchronous motor may further achieve low vibration and low noise by controlling the levels of vibration and noise generated by a motor.

BEST MODE FOR IMPLEMENTING THE INVENTION

Embodiment 1

FIG. 1 through FIG. 3 describe a first embodiment. FIG. 1 shows a horizontal cross section of a permanent magnet synchronous motor 100. FIG. 2 shows a diagram illustrating a part of a rotor 40 of the permanent magnet synchronous motor 100. FIG. 3 shows a diagram illustrating a part of a stator 30 and a part of the rotor 40 of the permanent magnet synchronous motor 100.

Referring to FIG. 1, the permanent magnet synchronous motor 100 includes the stator 30 and the rotor 40. The stator 30 includes a stator core 1 and stator windings 4. The stator core 1 is formed to include nine axially extending slots 3 along the inner circumference of the stator 30. The stator core 1 is formed by layers of magnetic steel plates, each being approximately 0.1 to 1.0 mm thick. Nine magnetic pole teeth 2 are formed each between adjacent slots 3. Each magnetic pole tooth 2 protrudes from the side of the outer circumference to the side of the inner circumference in a shape that opposite sides are almost parallel. The magnetic pole tooth is formed like a circular arc spreading out along the circumferential direction on both sides of the inner circumference and the outer circumference.

The stator core 1 is an assembly of nine separate parts, each corresponding to a single magnetic pole tooth 2.

The stator windings 4 are wound by using a concentrated winding method, thereby winding the windings directly around the separate magnetic pole teeth 2 with a predetermined number of turns. The stator windings 4 may be made up of copper or aluminum wires, for example. The number of turns of wire, the diameter of a copper wire, etc of the stator windings 4 may be determined according to requirements for the permanent magnet synchronous motor 100 about desired torque, desired number of rotations, desired voltage to be applied to a motor, desired size of the cross-section area of the slot 3, and the like.

After the stator windings 4 are wound around the separate magnetic pole teeth 2, the separate magnetic pole teeth 2 are processed by welding, press fitting, etc. This may result in completion of the stator 30 whose cross section is circular. In the process of press fitting, the separate magnetic pole teeth 2 need to be formed into a corrugated shape at connections to each other.

On the inner circumference side of the stator 30 is the rotor 40 placed via an air gap of approximately 0.1 to 2.0 mm. The rotor 40 includes a rotor core 5 and permanent magnets 7. The rotor core 5, like the stator core 1, is formed by layers of magnetic steel plates, each being approximately 0.1 to 1.0 mm thick.

The rotor core 5 includes six magnet retaining holes 8 situated at positions corresponding to the respective sides of an approximate regular hexagon that centers on the center of the axis of the rotor core 5. Six pieces of the permanent magnets 7 are embedded in the magnet retaining holes 8 in such a manner that magnetic North Poles and magnetic South Poles are arranged alternately along the circumferential direction. The permanent magnets 7 are flat rate-earth magnets, which may consist primarily of neodymium, iron, and boron.

On the outer circumferential side of the magnet retaining hole 8 in the rotor core 5 are radially elongated slits 6 spaced from each other along the magnet retaining hole 8. FIG. 1 shows an example of seven slits 6 provided for each pole of the permanent magnets 7 (one of the magnet retaining holes 8).

The center of the magnet retaining hole 8 (the permanent magnet 7) is defined as a "magnetic pole center of rotor". A border portion between adjacent magnet retaining holes 8 (the permanent magnets 7) is defined as a "pole border portion of rotor".

FIG. 2 shows a portion of the rotor 40 of the permanent magnet synchronous motor 100 for one pole. Referring to FIG. 2, seven slits 6, slits 61-67, are provided for one pole where a slit 64 is positioned on the magnetic pole center of rotor.

The seven slits 61-67 are positioned symmetrically with respect to the magnetic pole center of rotor with the slit 64 on the magnetic pole center of rotor. The seven slits 61-67 are spaced from each other in this order from one end of the magnet retaining hole 8.

The slits 62-66, five slits out of the seven slits, positioned at or near the magnetic pole center of rotor, are oriented in the direction where the magnetic flux generated by the permanent magnet 7 almost converges outside the rotor 40 so that the magnetic flux converges at the magnetic pole center of rotor. It is preferable that the center lines of the five slits 62-66 converge at a point X outside the rotor 40 as shown in FIG. 2. Equivalent properties, however, may be obtained even when these center lines almost converge at the point X as well. The point X is preferable to locate inside the outer circumference of the stator core 1.

The slits 61 and 67, two slits placed in the vicinity of pole border portions, are oriented in a different direction from the direction of the other five slits, 62-66, placed at or near the magnetic pole center of rotor. The two slits, 61 and 67, in the vicinity of the pole border portions may be oriented in a perpendicular direction with respect to the permanent magnet 7 (the magnet retaining hole 8), for example.

The stator core 1 has nine magnetic poles (slots) whereas the rotor has six poles. For this reason, the width of the permanent magnet 7 is made larger than the magnetic pole width of the magnetic pole tooth 2 of the stator 30. However, the five slits 62-66 positioned at or near the magnetic pole center of rotor are oriented in the direction where the magnetic flux generated by the permanent magnet 7 almost converges outside the rotor 40. This allows the stator 30 based on the concentrated winding method to make effective use of the magnetic flux of the permanent magnets 7.

The slits 61 and 67, positioned in the vicinity of the pole border portions, are oriented perpendicular to the permanent magnet 7. The slits 61 and 67, in the vicinity of the pole border portions may be oriented in the direction where the magnetic flux converges, in the same manner as that of the slits 62-66 positioned at or near the magnetic pole center of rotor. This may also help achieve effective use of the magnet flux. In this case, however, the inclination of the slit 61, 67 from the orientation of the magnetic flux of the permanent magnet 7 becomes large. This may cause blocking of the magnetic flux of the permanent magnet 7 at the ends in the pole border portions of rotor. Thus, the slits 61 and 67, positioned in the vicinity of the pole border portions of rotor, may be oriented in the different direction from the direction of the orientation of the other slits 62-66 positioned at or near the magnetic pole center of rotor (e.g., the slits 61 and 67 may be oriented perpendicular to the permanent magnet 7). This may help achieve effective use of the magnetic flux of the permanent magnets 7 not only in the center portion but also on the edges.

The effective use of the magnetic flux of the permanent magnet 7 may achieve as follows: when the amount of electric current applied to the stator windings 4 is constant, then torque generated by the permanent magnet synchronous motor 100 may become large; and when the torque is constant, then the electric current applied to the stator windings 4 may become small in amount. This may reduce copper loss and result in providing the permanent magnet synchronous motor 100 that is highly efficient.

When both the torque and the electric current are constant, then the volume of the permanent magnet 7 may become small. This may result in providing the permanent magnet synchronous motor 100 at low costs.

FIG. 3 shows a cross section of a permanent magnet synchronous motor illustrating a part of the stator core 1 only for one of the nine magnetic pole teeth 2 and a part of the rotor core 5 only for one of the six poles. Referring to FIG. 3, an A denotes the size of the width of the magnetic pole tooth 2 on the side of the air gap facing the rotor core 5. A B denotes a distance between the slit 62 and the slits 66. The slits 62 and 66 are the farthest from the magnetic pole center of rotor of the six slits 62-66 oriented in the direction where the magnetic flux converges. (The measurement of the distance will be taken from the corners of the slits 62 and 66 on the side of the respective pole border portions of rotor.) The slits are formed to satisfy A>B.

When A>B, then the magnetic flux of the permanent magnet 7 may converge effectively at the magnetic pole tooth 2. This may result in achieving a highly efficient permanent magnet synchronous motor.

A C denotes a distance between the slit 61 and the slit 67 positioned in the vicinity of the respective pole border portions of rotor. The distance is actually between the corners of the slits 61 and 67 facing the magnet retaining hole 8 and the respective pole border portions of rotor. When C>A>B, then the magnetic flux of the permanent magnet 7 may be used effectively in the end portions. Another advantage is that the waveform of voltage induced to the stator windings 4 (hereinafter referred to as "electromotive force") may be approximated to a sine wave.

The waveform of the electromotive force is almost determined by the shapes and positions of the stator core 1, the permanent magnets 7, the magnet retaining holes 8 and the slits 6. The shapes of the slits 61 and 67 in the vicinity of the respective pole border portions of rotor especially have a great influence on the waveform of the electromotive force.

When the waveform of the electromotive force approximates a sine wave, that is, the harmonic components of the electromotive force is reduced, then the levels of vibration and noise caused by the permanent magnet synchronous motor 100 in operation may be controlled. Another advantage is to prevent deterioration in efficiency caused by an increase in iron loss. When C>A, then the magnetic flux in the pole border portions of rotor may have a smooth change. This may serve to make the waveform of the electromotive force approximate a sine wave. As a result, the permanent magnet synchronous motor 100 may achieve low vibration and low noise. When the size of C is made smaller than the horizontal width of the permanent magnet 7, then an enhanced effect may be obtained.

With this embodiment, the stator 30 has nine pieces of the magnetic pole teeth 2 and the rotor 40 has six magnetic poles, as described. A similar effect may also be obtained, however, with another combination of the stator 30 having 12 pieces of the magnetic pole teeth 2 and the rotor 40 having eight magnetic poles, for example. Even a combination of the stator 30 having 18 pieces of the magnetic pole teeth 2 and the rotor 40 having 12 magnetic poles may achieve a similar effect.

With reference to the slits 6, there are seven of them in the description, but a similar effect may be obtained in fact with four or more of them.

Embodiment 2

FIG. 4 shows a diagram describing a second embodiment, which illustrates a portion of the rotor core 5 of the permanent magnet synchronous motor 100.

Referring to FIG. 4, an outside narrow bridge 9 denotes a part of the core on the outer circumferential side of the slit 67 in the vicinity of the pole border portion. An inside narrow bridge 11 denotes a part of the core between the slit 67 and the magnet retaining hole 8. An outside narrow bridge in pole border portion 10 denotes a part of the core adjacent to the magnet retaining hole 8 in the vicinity of the pole border portion on the outer circumferential side.

According to this embodiment, D1<D2 may be satisfied where the D1 denotes the size of the width (a size in the radial direction) of the outside narrow bridge 9 and the D2 denotes the size of the width (a size in the radial direction) of the outside narrow bridge in a pole border portion 10. According to the first embodiment, in order to approximate the waveform of the electromotive force to a sine wave, the shape of the slit 67 in the vicinity of the pole border portion of rotor may be a key factor, as described. The shape and size of the outside narrow bridge in a pole border portion 10, like the shape of the slit 67, are also key factors for making the waveform of the electromotive force approximate a sine wave.

When D2≦D1, the electromotive force becomes large in value. There is a tendency, however, the waveform of the electromotive force includes distortion with harmonic components. The waveform of the electromotive force may be able to approximate a sine wave when D2>D1. When the size of the D2 is too large, however, the magnetic flux of the permanent magnet 7 may leak to the outside narrow bridge in pole border portion 10 of an adjacent pole. This may result in reducing the voltage value of the electromotive force, and thereby deteriorate the efficiency of the permanent magnet synchronous motor. It is preferable therefore to set the size of the D2 approximately to 1.2 to 3 times the size of D1. It is also desirable to set the size of D1 approximately to 1 to 2 times the thickness (approximately 0.1 to 1 mm) of one of the magnetic steel plates that form the rotor core 5.

When the permanent magnet synchronous motor 100 runs at high speed of over 7000 revolutions per minute (rpm), the following may occur: if the size of the D2 is too small for such a high speed operation, the stress may be concentrated at the outside narrow bridge in pole border portion 10 due to centrifugal forces at high speed rotation; and then in the worst case, the outside narrow bridge in pole border portion 10 may brake or may be damaged.

With this embodiment, by making the size of the D2 larger than the size of D1, the strength may be increased against centrifugal forces. Therefore, the permanent magnet synchronous motor 100 may achieve high reliability. Another advantage is to achieve the permanent magnet synchronous motor 100 with low vibration and low noise due to reduced harmonic components in the electromotive force.

A D3 denotes the size of the width of the inside narrow bridge 11, in which D2<D1+D3 is satisfied. The magnetic flux of the permanent magnet 7 includes a portion that flows to the magnetic pole tooth 2 of the stator 30 to be used as torque and a portion of leakage flux that flows in the direction of adjacent permanent magnets 7. The leakage flux passes through the outside narrow bridge in a pole border portion 10, and thus the size of the D2 is very important.

The magnetic flux of the permanent magnet 7 in a portion nearer to the magnetic pole center of rotor than the slit 67 passes through the outside narrow bridge 9 (the width size D1) and the inside narrow bridge 11 (the width size D3), and then leaks to the adjacent permanent magnet 7 via the outside narrow bridge in pole border portion 10 (the width size D2).

Here, because D2<D1+D3, the leakage flux of the permanent magnet 7 through the D1 and the D3 may be controlled at the D2. This may help achieve effective use of the magnetic flux of the permanent magnet 7. As a result, the permanent magnet synchronous motor 100 may achieve high efficiency.

Embodiment 3

FIG. 5 shows a diagram describing a third embodiment, which illustrates a vertical cross section of a rotary compressor 20 (an example of a hermetic compressor). Referring to FIG. 5, a hermetic housing 22 of the rotary compressor 20 contains a motor unit 21 and a compressor unit 23. For the motor unit 21, the permanent magnet synchronous motor 100 described in the first embodiment or the second embodiment may be used.

A suction tube 24 is connected to an evaporator of a refrigeration cycle (not shown in the figure) for leading a refrigerant to the compressor unit 23. A discharge tube 25 is connected to a condenser of the refrigeration cycle for sending high pressure refrigerant from the hermetic container 22 to the refrigeration cycle.

When the permanent magnet synchronous motor 100 described in the first embodiment or the second embodiment is mounted in the rotary compressor 20, the rotary compressor 20 then becomes highly efficient because the permanent magnet synchronous motor 100 is highly efficient. This highly efficient rotary compressor 20 may be used in an air conditioner or a fridge-freezer. This may greatly contribute to the purposes of energy conservation.

EXPLANATION OF REFERENCE NUMERALS

Figure 1:
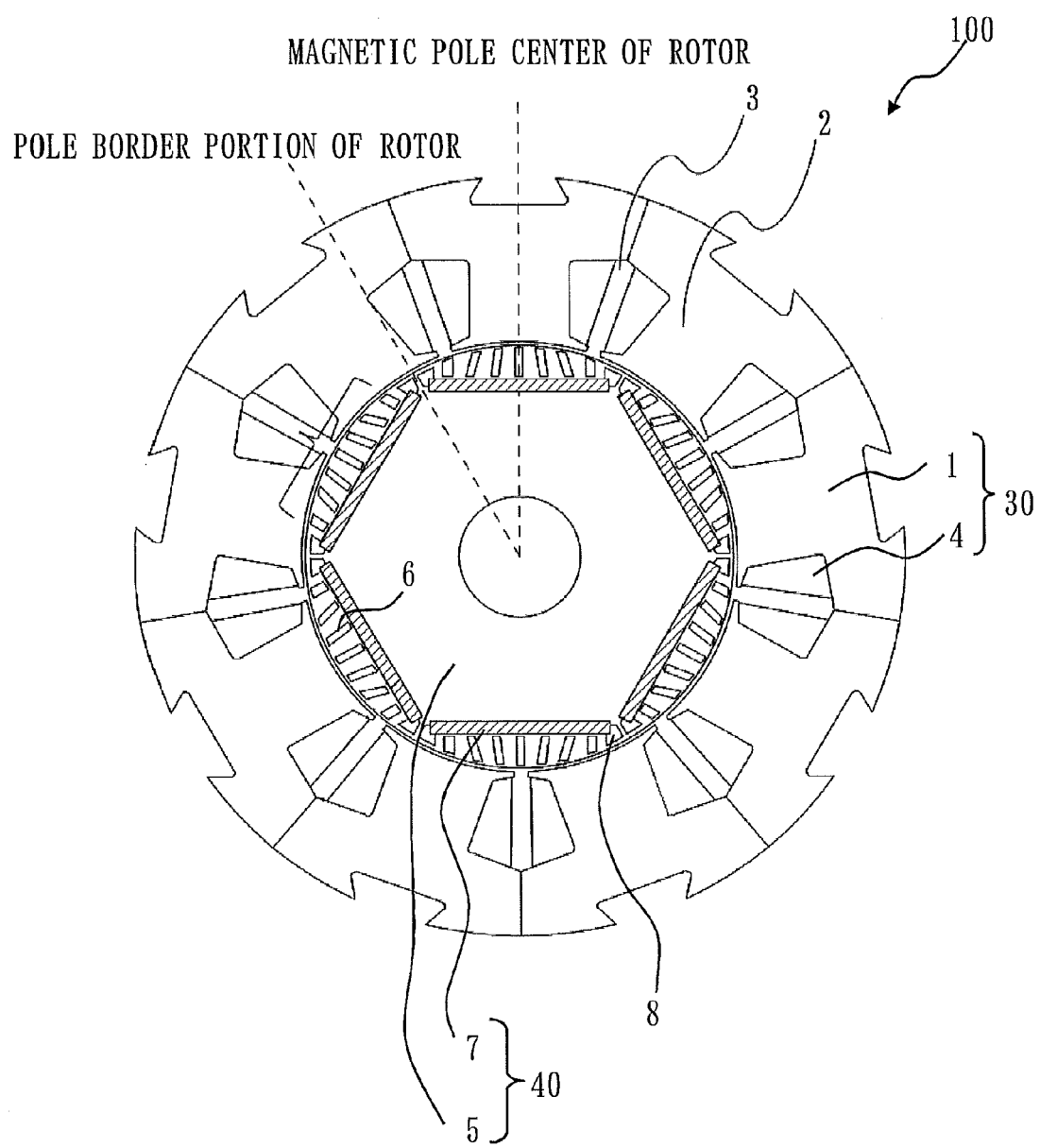
FIG. 1 shows a diagram describing a first embodiment, which illustrates a horizontal cross section of a permanent magnet synchronous motor 100.
Figure 2:
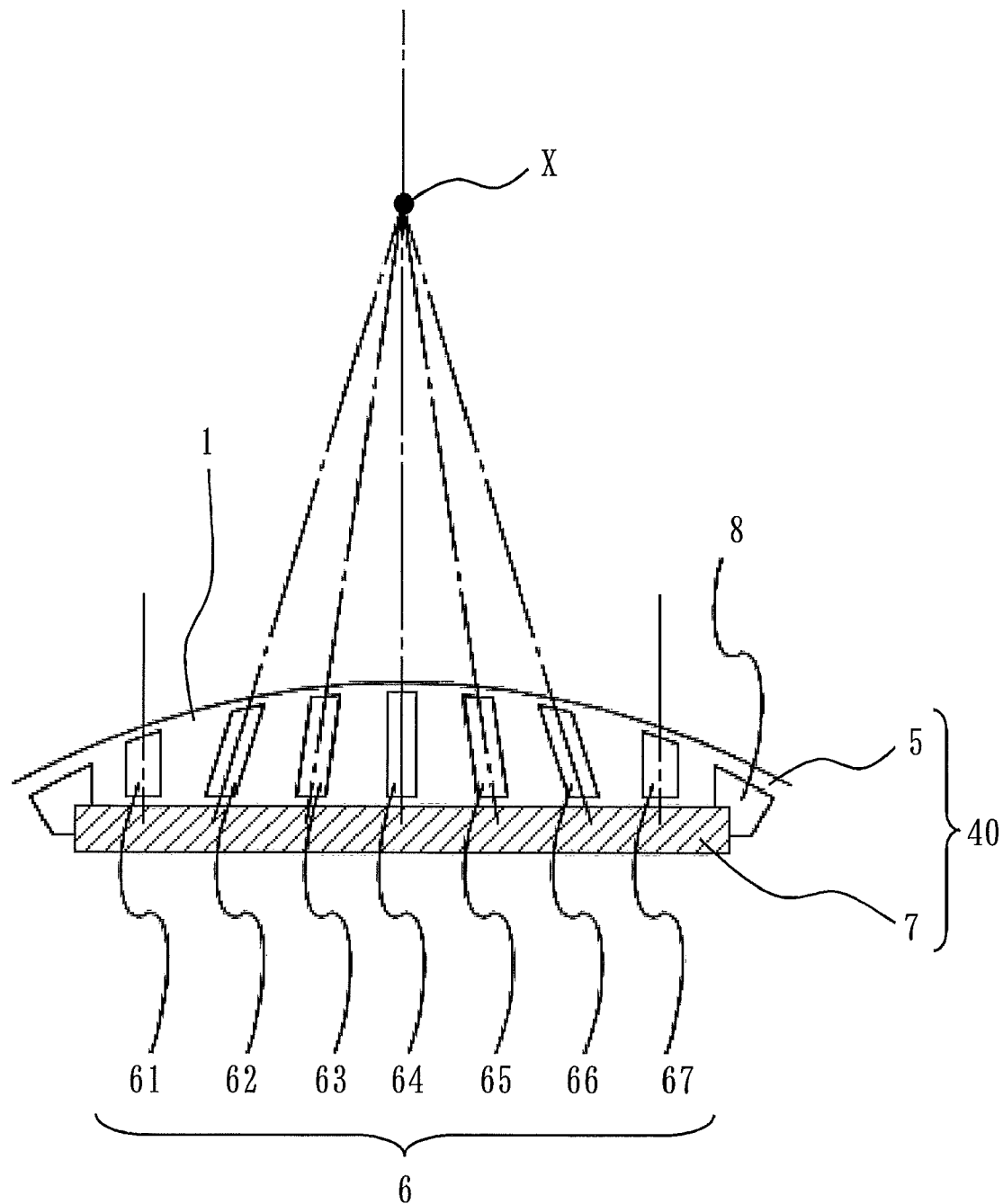
FIG. 2 shows a diagram describing the first embodiment, which illustrates a part of a rotor 40 of the permanent magnet synchronous motor 100.
Figure 3:
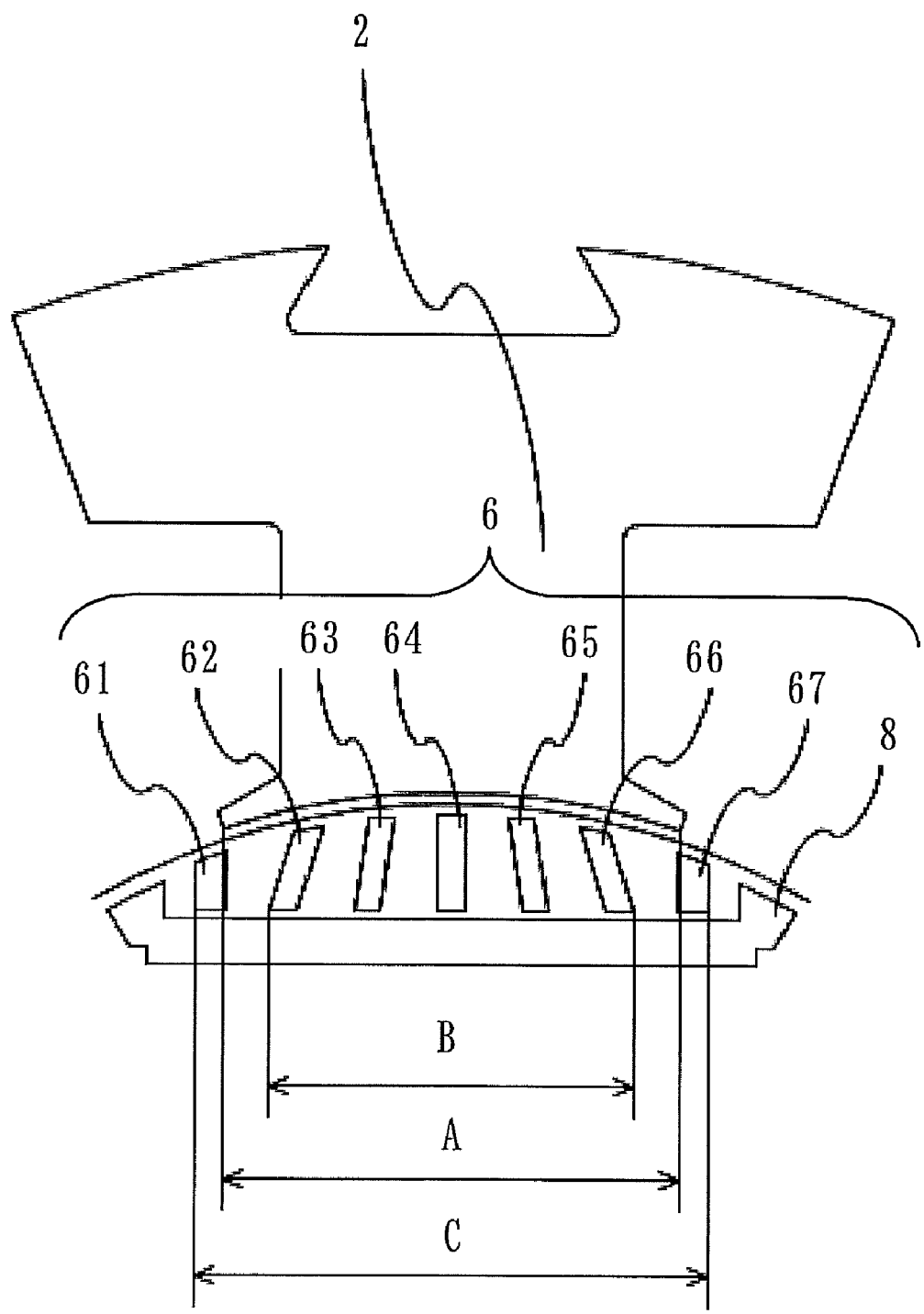
FIG. 3 shows a diagram describing the first embodiment, which illustrates a part of a stator 30 and a part of a rotor 40 of the permanent magnet synchronous motor 100.
Figure 4:
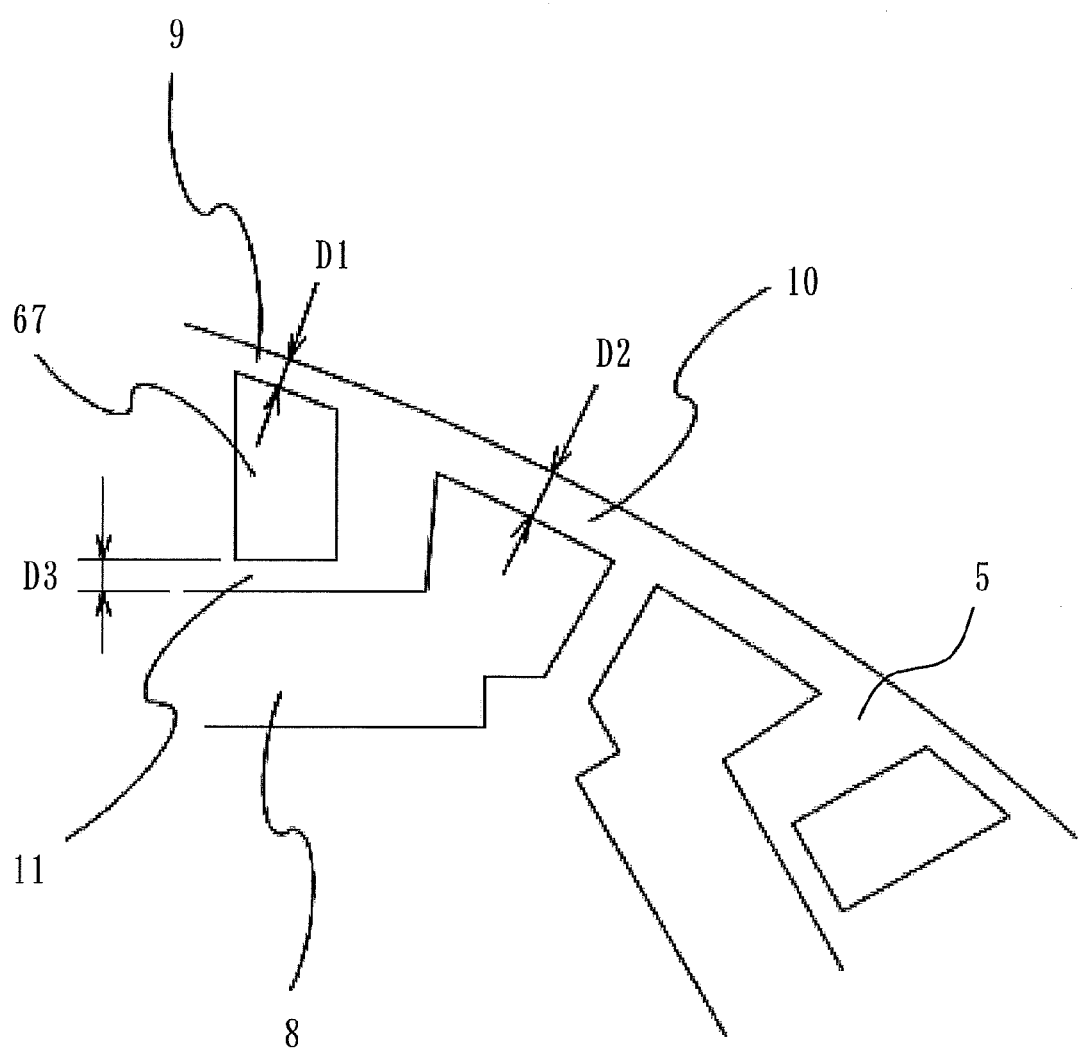
FIG. 4 shows a diagram describing a second embodiment, which illustrates a part of a rotor core 5 of the permanent magnet synchronous motor 100.
Figure 5:
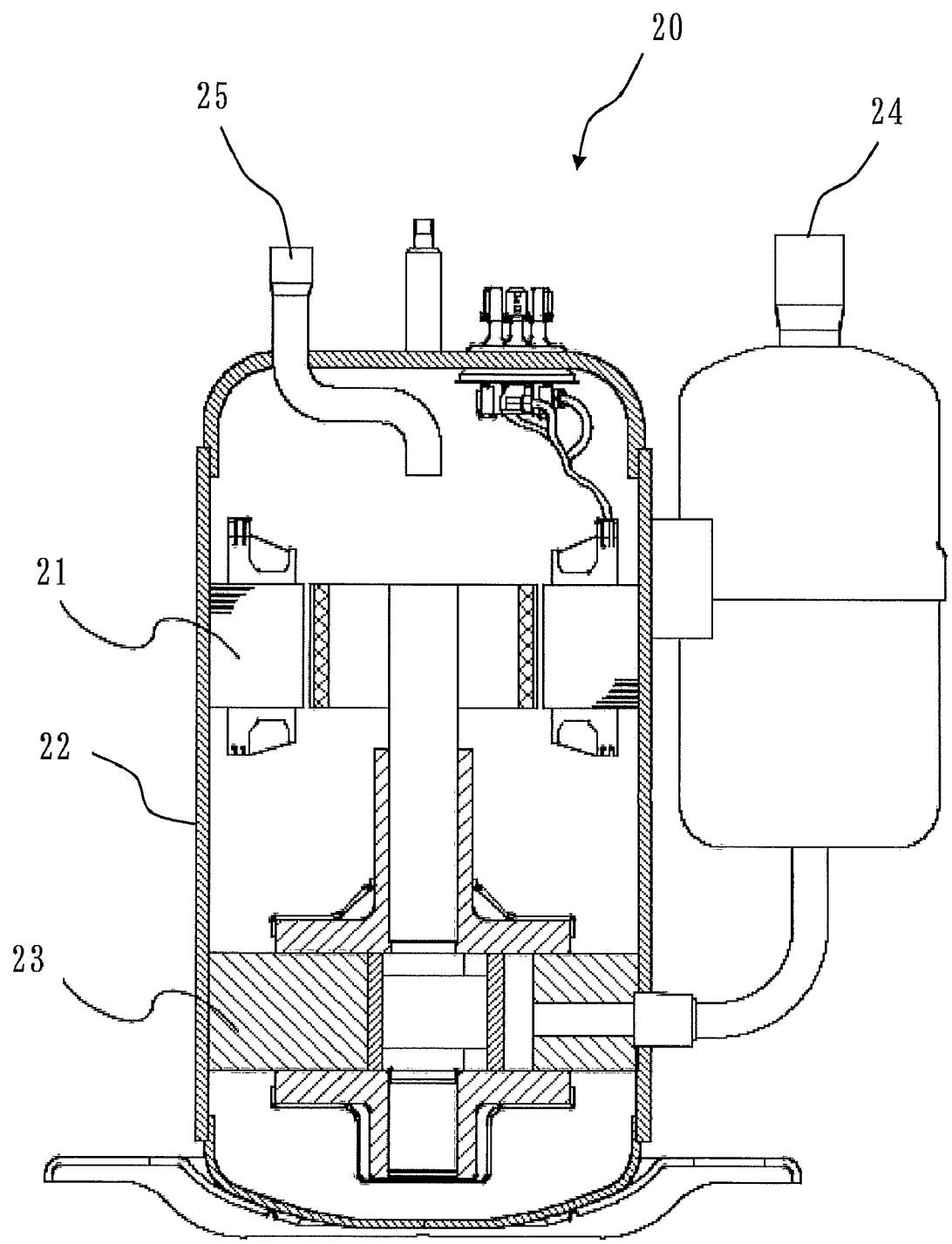
FIG. 5 shows a diagram describing a third embodiment, which illustrates a vertical cross section of a rotary compressor 20.

1 stator core
2 magnetic pole teeth
3 slot
4 stator winding
5 rotor core
6 slit
7 permanent magnet
8 magnet retaining hole
9 outside narrow bridge
10 outside narrow bridge at pole border portion
11 inside narrow bridge
20 rotary compressor
21 motor unit
22 hermetic housing
23 compression unit
24 suction tube
25 discharge tube
30 stator
40 rotor
61 slit
62 slit
63 slit
64 slit
65 slit
66 slit
67 slit
100 permanent magnet synchronous motor

The invention claimed is:

1. A permanent magnet synchronous motor comprising:
   a stator; and
   a rotor,
   the stator including:
   a stator core that is formed by layers of magnetic steel plates, the stator core including magnetic pole teeth, each magnetic pole tooth being formed between adjacent slots; and
   stator windings that are provided in the slots of the stator core,
   the rotor, which is placed on an inner circumferential side of the magnetic pole teeth of the stator via an air gap, including:
   a rotor core that is formed by layers of magnetic steel plates;
   a plurality of magnet retaining holes formed in the rotor core along an outer circumference of the rotor core;
   permanent magnets inserted in the magnet retaining holes; and
   a plurality of slits formed in the rotor core on an outer circumferential side of the magnet retaining holes, the slits being elongated from a vicinity of the permanent magnets to a vicinity of the outer circumference of the rotor core,
   wherein among the plurality of slits, slits formed in a vicinity of a magnetic pole center of the rotor core are oriented in a direction where a magnetic flux generated by a permanent magnet converges outside the rotor core, and slits formed in a vicinity of a pole border portion of the rotor core are oriented in another direction that is different from the direction of the slits formed in the vicinity of the magnetic pole center of the rotor core; and wherein a width in a radial direction of an outside narrow bridge in the pole border portion is larger than a width in the radial direction of another outside narrow bridge, the outside narrow bridge in the pole border portion being a part of the rotor core on the outer circumferential side of a magnet retaining hole in a vicinity of the pole border portion of the rotor, and the another outside narrow bridge being a part of the rotor core on the outer circumferential side of one of the slits formed in the vicinity of the pole border portion.

2. The permanent magnet synchronous motor according to claim 1, wherein the stator uses a concentrated winding method by which the stator windings are directly wound around the magnetic pole tooth.

3. The permanent magnet synchronous motor according to claim 2, wherein the slits in the vicinity of the magnetic pole center of the rotor core are formed within a width of the magnetic pole tooth on a side facing the air gap and opposed to the rotor core.

4. The permanent magnet synchronous motor according to claim 2, wherein the stator core is an assembly of separate cores, each core including one of the magnetic pole teeth.

5. The permanent magnet synchronous motor according to claim 2, wherein a distance between the slits that are formed in the vicinity of pole border portions of the rotor core and positioned at both ends of a magnet retaining hole in the circumferential direction is larger than a width of the magnetic pole tooth on a side facing the air gap, the distance being measured from corners of the slits on a side of the slits facing a magnet retaining hole and on sides of the slits facing respective pole border portions of the rotor core.

6. The permanent magnet synchronous motor according to claim 1, wherein a sum of the width in the radial direction of the another outside narrow bridge and a width in the radial direction of an inside narrow bridge is larger than the width in the radial direction of the outside narrow bridge in the pole border portion, the inside narrow bridge being a part of the rotor core between the one of the slits formed in the vicinity of the pole border portion and the magnet retaining hole.

7. A hermetic compressor, comprising the permanent magnet synchronous motor according to claim 1.

8. The permanent magnet synchronous motor according to claim 1, wherein the slits formed in a vicinity of a pole border portion of the rotor core are oriented in a perpendicular direction with respect to the permanent magnet.

9. A permanent magnet synchronous motor comprising:
a stator; and
a rotor,
the stator including:
a stator core that is formed by layers of magnetic steel plates, the stator core including magnetic pole teeth, each magnetic pole tooth being formed between adjacent slots; and
stator windings that are provided in the slots of the stator core,
the rotor, which is placed on an inner circumferential side of the magnetic pole teeth of the stator via an air gap, including:

a rotor core that is formed by layers of magnetic steel plates;
a plurality of magnet retaining holes formed in the rotor core along an outer circumference of the rotor core;
permanent magnets inserted in the magnet retaining holes; and
a plurality of slits formed in the rotor core on an outer circumferential side of the magnet retaining holes, the slits being elongated from a vicinity of the permanent magnets to a vicinity of the outer circumference of the rotor core, wherein among the plurality of slits, slits formed in a vicinity of a magnetic pole center of the rotor core are oriented in a direction where a magnetic flux generated by a permanent magnet converges outside the rotor core, and slits formed in a vicinity of a pole border portion of the rotor core are oriented in another direction that is different from the direction of the slits formed in the vicinity of the magnetic pole center of the rotor core; and wherein a sum of a width in a radial direction of an outside narrow bridge and a width in the radial direction of an inside narrow bridge is larger than a width in the radial direction of another outside narrow bridge in the pole border portion, the outside narrow bridge being a part of the rotor core on the outer circumferential side of one of the slits formed in a vicinity of the pole border portion, the inside narrow bridge being a part of the rotor core between the one of the slits formed in the vicinity of the pole border portion and a magnet retaining hole, and the another outside narrow bridge in the pole border portion being a part of the rotor core on the outer circumferential side of the magnet retaining hole in the vicinity of the pole border portion.

10. The permanent magnet synchronous motor according to claim 9, wherein the stator uses a concentrated winding method by which the stator windings are directly wound around the magnetic pole tooth.

11. The permanent magnet synchronous motor according to claim 10, wherein the slits in the vicinity of the magnetic pole center of the rotor core are formed within a width of the magnetic pole tooth on a side facing the air gap and opposed to the rotor core.

12. The permanent magnet synchronous motor according to claim 10, wherein the stator core is an assembly of separate cores, each core including one of the magnetic pole teeth.

13. The permanent magnet synchronous motor according to claim 10, wherein a distance between the slits that are formed in the vicinity of pole border portions of the rotor core and positioned at both ends of a magnet retaining hole in the circumferential direction is larger than a width of the magnetic pole tooth on a side facing the air gap, the distance being measured from corners of the slits on a side of the slits facing a magnet retaining hole and on sides of the slits facing respective pole border portions of the rotor core.

14. A hermetic compressor, comprising the permanent magnet synchronous motor according to claim 9.

* * * * *